(12) United States Patent
Dutterer

(10) Patent No.: US 11,020,872 B2
(45) Date of Patent: Jun. 1, 2021

(54) MITER SAW

(71) Applicant: TTI (MACAO COMMERCIAL OFFSHORE) LIMITED, Macau (MO)

(72) Inventor: David E. Dutterer, Belton, SC (US)

(73) Assignee: TTI (MACAO COMMERCIAL OFFSHORE) LIMITED, Macau (MO)

( * ) Notice: Subject to any disclaimer, the term of this patent is extended or adjusted under 35 U.S.C. 154(b) by 0 days.

(21) Appl. No.: 16/003,573

(22) Filed: Jun. 8, 2018

(65) Prior Publication Data

US 2018/0354154 A1    Dec. 13, 2018

Related U.S. Application Data

(60) Provisional application No. 62/518,692, filed on Jun. 13, 2017.

(51) Int. Cl.
| | | |
|---|---|---|
| *B27B 27/06* | (2006.01) | |
| *B23D 45/02* | (2006.01) | |
| *B27B 27/08* | (2006.01) | |
| *B23D 45/04* | (2006.01) | |

(52) U.S. Cl.
CPC ............ *B27B 27/06* (2013.01); *B23D 45/024* (2013.01); *B23D 45/028* (2013.01); *B27B 27/08* (2013.01); *B23D 45/048* (2013.01)

(58) Field of Classification Search
CPC ......... B27B 27/06; B27B 27/00; B27B 27/04; B27B 27/10; B23D 45/04; B23D 45/042; B23D 45/044; B23D 45/048; B23D 45/024; B23D 45/028
See application file for complete search history.

(56) References Cited

U.S. PATENT DOCUMENTS

| | | | |
|---|---|---|---|
| 5,063,805 A | 11/1991 | Brundage | |
| 5,752,422 A | 5/1998 | Inoue et al. | |
| 6,474,206 B1 * | 11/2002 | Brunson | B23D 45/044 108/139 |
| 7,044,041 B1 * | 5/2006 | Chalkowsky | B23D 45/044 83/471.3 |
| 7,617,578 B2 | 11/2009 | Collins | |
| 2002/0100350 A1 * | 8/2002 | Brazell | B27B 27/08 83/438 |
| 2003/0228197 A1 | 12/2003 | Salvaryan | |

(Continued)

FOREIGN PATENT DOCUMENTS

| | | | | |
|---|---|---|---|---|
| CA | 2370645 A1 * | 2/2003 | ............ | B23D 45/044 |
| CA | 2437192 A1 * | 5/2004 | ............. | B27B 27/04 |

(Continued)

OTHER PUBLICATIONS

Australian Patent Office Action for Application No. 2018204189 dated Feb. 22, 2019, 3 pages.

(Continued)

*Primary Examiner* — Jennifer S Matthews
(74) *Attorney, Agent, or Firm* — Michael Best & Friedrich LLP

(57) ABSTRACT

A miter saw includes a base, a table pivotally coupled to the base about a miter axis, a saw unit coupled to the table for movement with the table about the miter axis, and a fence having a stop protruding from a rear surface thereof that is engageable by the table and/or the saw unit to limit miter angle adjustment of the saw unit.

20 Claims, 4 Drawing Sheets

(56) References Cited

U.S. PATENT DOCUMENTS

| | | | | |
|---|---|---|---|---|
| 2004/0074361 A1* | 4/2004 | Svetlik | ................ | B23D 45/044 |
| | | | | 83/471.3 |
| 2005/0247177 A1 | 11/2005 | Hetcher et al. | | |
| 2006/0005677 A1 | 1/2006 | Lambert et al. | | |
| 2010/0031795 A1 | 2/2010 | Collins | | |
| 2016/0075050 A1* | 3/2016 | Eiswerth | ................ | B27B 27/06 |
| | | | | 83/468.3 |
| 2017/0120353 A1* | 5/2017 | Tennant | ............... | B23D 47/025 |
| 2017/0129128 A1 | 5/2017 | Mortaro et al. | | |

FOREIGN PATENT DOCUMENTS

| | | | | |
|---|---|---|---|---|
| CA | 2974671 A1 * | 1/2018 | ............. | B27B 27/08 |
| DE | 102008014470 A1 | 9/2009 | | |

OTHER PUBLICATIONS

European Patent Office Search Report for Application No. 18177584.2 dated Nov. 13, 2018, 7 pages.

* cited by examiner

MITER SAW

CROSS-REFERENCE TO RELATED APPLICATIONS

This application claims priority to U.S. Provisional Patent Application No. 62/518,692 filed on Jun. 13, 2017, the entire content of which is incorporated herein by reference.

FIELD OF THE INVENTION

The invention relates to power tools, and more particularly to miter saws.

BACKGROUND OF THE INVENTION

Miter saws are generally used for making miter cuts on workpieces. In order to make such a miter cut on a workpiece, the saw blade must be angularly adjusted to a desired miter angle relative to a fence against which the workpiece is abutted. The fence is typically movable to create clearance for the saw blade when miter cuts are made at large miter angles.

SUMMARY OF THE INVENTION

The present invention provides, in one aspect, a miter saw comprising a base, a table pivotally coupled to the base about a miter axis, a saw unit coupled to the table for movement with the table about the miter axis, and a fence having a stop protruding from a rear surface thereof that is engageable by the table and/or the saw unit to limit miter angle adjustment of the saw unit.

The present invention provides, in another aspect, a miter saw comprising a base, a table pivotally coupled to the base about a miter axis, a saw unit coupled to the table for movement with the table about the miter axis, a first fence positioned on a first lateral side of the miter axis, the first fence having a first stop protruding from a rear surface thereof, and a second fence positioned on a second lateral side of the miter axis, the second fence having a second stop protruding from the rear surface. The table and/or saw unit is engageable with the first stop to limit miter angle adjustment of the saw unit in a first rotational direction about the miter axis. The table and/or saw unit is also engageable with the second stop to limit miter angle adjustment of the saw unit in a second rotational direction about the miter axis.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
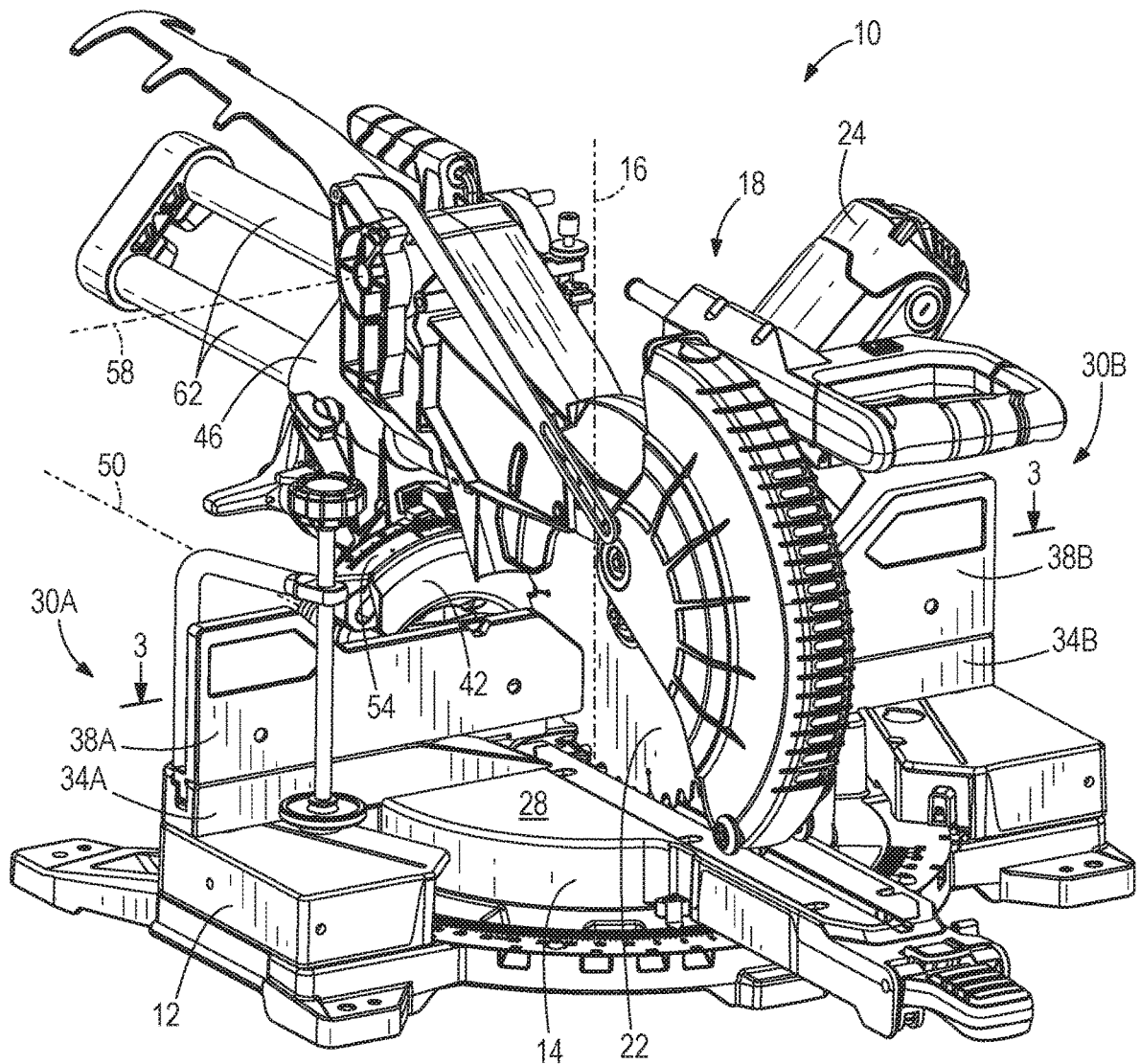
FIG. 1 is a front perspective view of a miter saw in accordance with an embodiment of the invention.

FIG. 1 illustrates a miter saw 10 including a base 12, a table 14 pivotably coupled to the base 12 about a miter axis 16, and a saw unit 18 supported upon the table 14. The saw unit 18 includes a saw blade 22, a motor 24 for rotating the saw blade 22, and an actuator (e.g., a trigger, not shown) for activating and deactivating the motor 24. The table 14 defines a workpiece support surface 28 upon which a workpiece may be placed in preparation for a cutting operation. The miter saw 10 also includes spaced fence assemblies 30A, 30B positioned on opposite sides of the miter axis 16 that are perpendicular to the work piece support surface 28 of the table 14 against which the workpiece may also be abutted during a cutting operation. Each of the fence assemblies 30A, 30B includes a stationary, lower fence portion 34A, 34B attached to the base 12 and an upper fence portion 38A, 38B that is slidably coupled to the lower fence portion 34A, 34B (see also FIG. 2).

With reference to FIG. 1, the table 14 includes a bevel arm mount 42 attached for co-rotation about the miter axis 16 with the workpiece support surface 28 and a bevel arm 46 pivotably coupled to the bevel arm mount 42 about a bevel axis 50 oriented transverse to the miter axis 16. The miter saw 10 also includes a bevel angle scale 54 carried by the bevel arm mount 42 for indicating the bevel angle at which the saw unit 18 is pivoted about the bevel axis 50 during use of the miter saw 10. With continued reference to FIG. 1, the saw unit 18 is pivotably coupled to the bevel arm 46 about a chop axis 58 oriented transverse to the miter axis 16 and the bevel axis 50. In the illustrated embodiment of the miter saw 10, the bevel arm 46 includes parallel guide rails 62 to facilitate sliding movement of the saw unit 18 in a direction parallel with the bevel axis 50, relative to the base 12 and table 14. Alternatively, the guide rails 62 may be omitted from the bevel arm 46, limiting the degrees of freedom of the saw unit 18 to pivoting movement about the miter axis 16, the bevel axis 50, and the chop axis 58.

Figure 2:
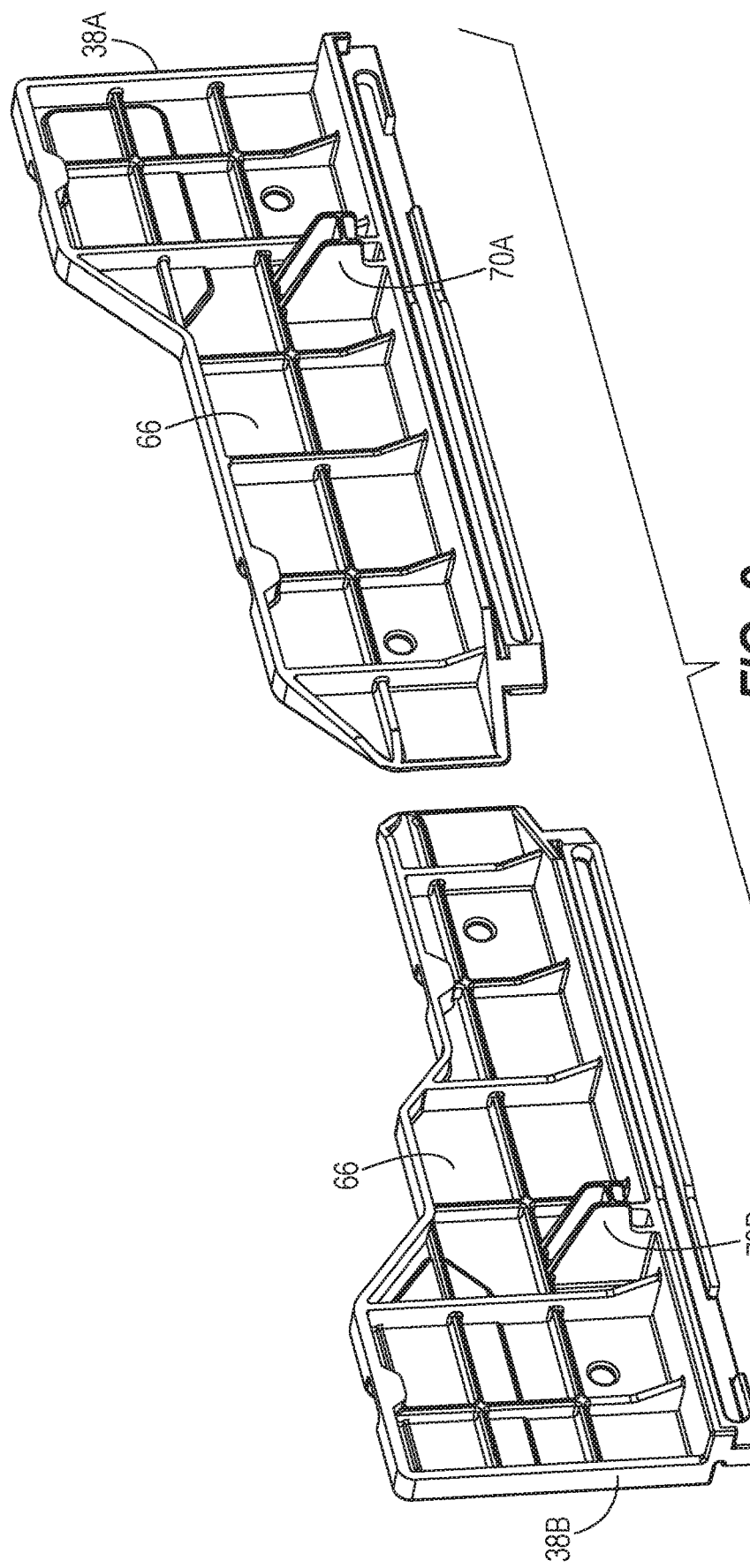
FIG. 2 is a rear view of two movable workpiece-supporting fences of the miter saw of FIG. 1.

With reference to FIG. 2, each of the upper fence portions 38A, 38B includes a rear surface 66 and a stop 70A, 70B protruding from the rear surface 66. Although the stops 70A, 70B may be shaped in any of a number of different ways, each of the stops 70A, 70B is generally perpendicular to the rear surface 66 of the upper fence portion 38A, 38B, extending in a direction that is transverse to the miter axis 16. Also in the illustrated embodiment of the miter saw 10, the stops 70A, 70B are integrally formed with the upper fence portions 38A, 38B as a single piece (e.g., using a die-cast or molding process). Alternatively, the stops 70A, 70B may be separate components that are attached to the upper fence portions 38A, 38B in any of a number of different ways (e.g., using fasteners, adhesives, integral quick-connect structures, etc.).

Figure 3:
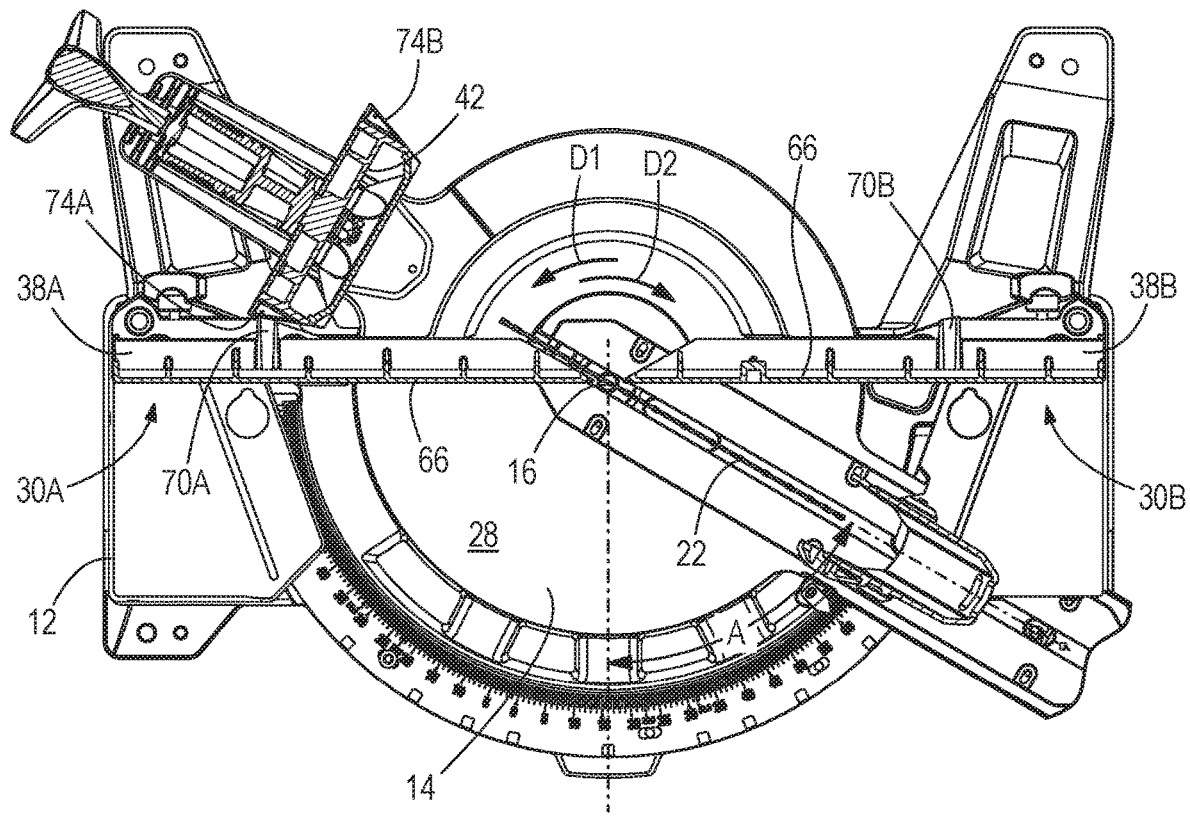
FIG. 3 is a top view of the miter saw of FIG. 1, with portions removed, illustrating a saw unit adjusted to a miter angle of about 60 degrees in a first rotational direction.
Figure 4:
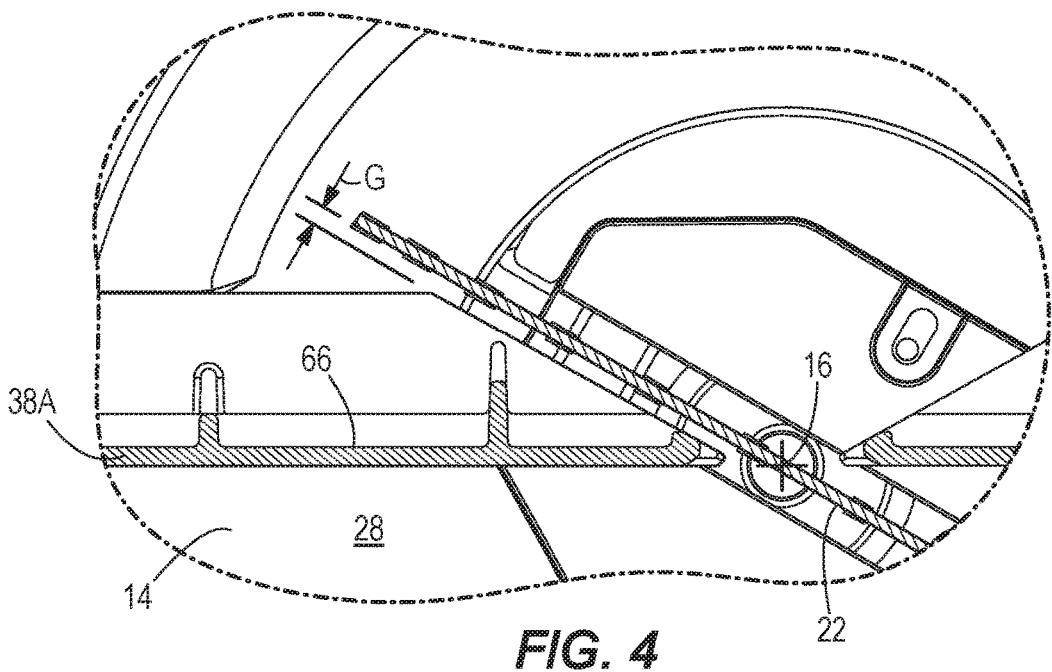
FIG. 4 is an enlarged view of the portion of the miter saw shown in FIG. 3.
Figure 5:
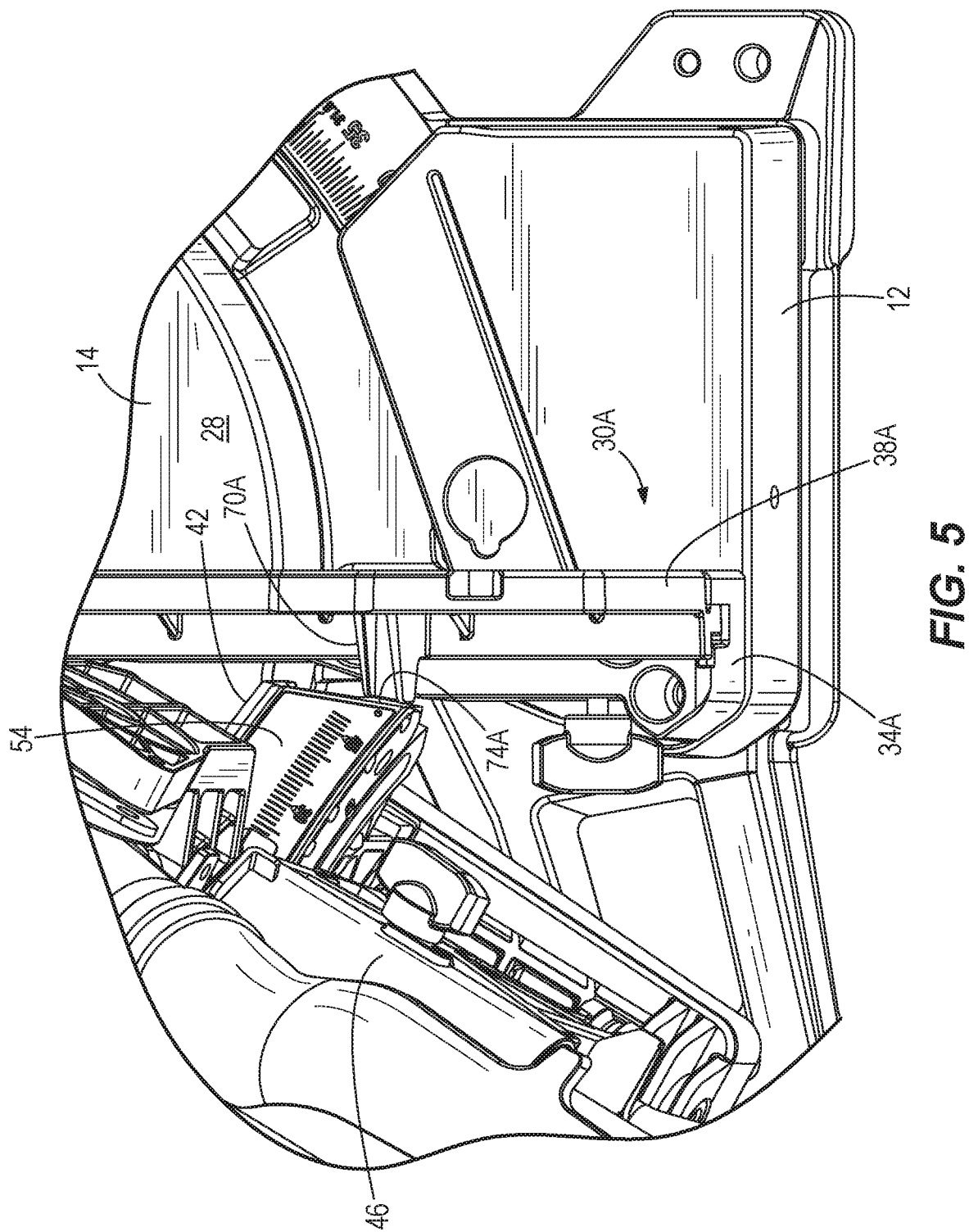
FIG. 5 is an enlarged, lateral perspective view of the portion of the miter saw shown in FIG. 3.

With reference to FIG. 3, the stops 70A, 70B are positioned on opposite lateral sides of the miter axis 16. Furthermore, when the upper fence portions 38A, 38B are adjusted to their innermost positions (i.e., where the upper fence portions 38A, 38B are located closest to the miter axis 16), the respective stops 70A, 70B are located equidistant from the miter axis 16. In this location of the upper fence portion 38A, the bevel arm mount 42 is engageable with the stop 70A to limit miter angle adjustment of the saw unit 18 in a first rotational direction D1 about the miter axis to a miter angle A of about +60 degrees, while maintaining a minimum gap G between the saw blade and the upper fence portion 38A of at least about 8 mm (FIG. 4). As shown in FIG. 4, the gap G is measured in a direction perpendicular to the saw blade 22 when the saw blade 22 is located at a miter angle A of about +60 degrees. As would be understood by one of ordinary skill in the art, the miter angle A of the saw unit 18 is 0 degrees when the saw blade 22 is oriented perpendicular to the fence assemblies 30A, 30B, and a positive miter angle results from counter-clockwise movement of the table 14 and saw unit 18 from the frame of reference of FIG. 3.

Likewise, although not shown in the drawings, in the location of the upper fence portion 38B shown in FIG. 3, the bevel arm mount 42 is engageable with the stop 70B to limit miter angle adjustment of the saw unit 18 in a second rotational direction D2 about the miter axis 16 to a miter angle A of about −60 degrees, while maintaining a minimum gap G between the saw blade 22 and the upper fence portion 38B of at least about 8 mm. In this manner, the combined miter angle adjustment of the saw unit 18 in the first and second rotational directions D1, D2, without requiring outward adjustment of either of the upper fence portions 38A, 38B, is about 120 degrees. However, when a miter angle greater than +/−60 degrees is desired, the user needs only to slide one or both of the upper fence portions 38A, 38B laterally away from the miter axis 16, thereby relocating the stop(s) 70A, 70B to a position where the bevel arm mount 42 is incapable of contacting them.

With continued reference to FIG. 3, opposite sides 74A, 74B of the bevel arm mount 42 are engageable with the stops 70A, 70B, respectively, when the miter angle of the saw unit 18 is adjusted in the first and second rotational directions D1, D2. Alternatively, separate stops may be defined on or otherwise attached to the workpiece support surface 28, the bevel arm mount 42, the bevel arm 46, or the saw unit 18 capable of engagement with the respective stops 70A, 70B on the upper fence portions 38A, 38B to limit miter angle adjustment of the saw unit 18.

Various features of the invention are set forth in the following claims.

What is claimed is:

1. A miter saw comprising:
   a base;
   a table pivotally coupled to the base about a miter axis;
   a saw unit coupled to the table for movement with the table about the miter axis; and
   a fence assembly including
      a first fence being stationary respective to the base, and
      a second fence coupled to the first fence, the second fence being disposed over and slidable on the first fence between a first position while coupled to the first fence and a second position while coupled to the first fence, the second fence including a work support surface, a rear surface opposite the work support surface, a plurality of vertical support structures extending from the rear surface, and a stop located between a pair of the vertical support structures, the stop protruding from the rear surface of the second fence beyond a distance in which the vertical support structures extend from the rear surface, the stop being movable with the second fence so that the stop is engageable by the table and/or the saw unit when the second fence is in the first position to limit miter angle adjustment of the saw unit to a determined degree, and wherein the table and/or the saw unit is incapable of engaging the stop when the second fence is in the second position to allow the miter angle adjustment of the saw unit to be greater than the determined degree.

2. The miter saw of claim 1, wherein the table includes a bevel arm mount and a bevel arm pivotably coupled to the bevel arm mount about a bevel axis oriented transverse to the miter axis.

3. The miter saw of claim 2, wherein the bevel arm mount is engageable with the stop to limit miter angle adjustment of the saw unit.

4. The miter saw of claim 3, wherein the saw unit is pivotably coupled to the bevel arm about a chop axis oriented transverse to the miter axis and the bevel axis.

5. The miter saw of claim 3, wherein the fence assembly is a first fence assembly and the stop is a first stop, and wherein the first fence assembly is positioned on a first lateral side of the miter axis.

6. The miter saw of claim 5, further comprising a second fence assembly positioned on a second lateral side of the miter axis, wherein the second fence assembly includes a third fence fixedly coupled to the base and a fourth fence slidably coupled to the third fence, and wherein the fourth fence includes a second stop protruding from the rear surface thereof.

7. The miter saw of claim 6, wherein the bevel arm mount is engageable with the first stop to limit miter angle adjustment of the saw unit in a first rotational direction about the miter axis, and wherein the bevel arm mount is engageable with the second stop to limit miter angle adjustment of the saw unit in a second rotational direction about the miter axis.

8. The miter saw of claim 7, wherein the combined miter angle adjustment of the saw unit in the first and second rotational directions is about 120 degrees.

9. The miter saw of claim 7, wherein a first side of the bevel arm mount is engageable with the first stop, and wherein a second side of the bevel arm mount is engageable with the second stop.

10. The miter saw of claim 1, wherein the first position of the second fence is an innermost position of the second fence relative to the miter axis.

11. The miter saw of claim 10, wherein the determined degree is about 60 degrees.

12. The miter saw of claim 1, wherein the second fence is slidable in a lateral direction on the first fence, wherein the stop includes a planar surface engageable by the table and/or the saw unit when the second fence is in the first position, and wherein the planar surface is obliquely oriented relative to the lateral direction when the second fence is in the first and second positions.

13. A miter saw comprising:
   a base;
   a table pivotally coupled to the base about a miter axis;
   a saw unit coupled to the table for movement with the table about the miter axis;
   a first fence moveably positioned on a first lateral side of the miter axis between a first position and a second position, the first position of the first fence is an innermost position of the first fence relative to the miter axis, the first fence having a work support surface, a rear surface opposite the work support surface, a plurality of vertical support structures extending from the rear surface, and a first stop located between a pair of the vertical support structures of the first fence, the first stop protruding from the rear surface of the fence beyond a distance in which the vertical support structures of the first fence extend from the rear surface of the first fence, the first stop movable with the first fence relative to the base; and a second fence moveably positioned on a second lateral side of the miter axis between a first position and a second position, the first position of the second fence is an innermost position of the second fence relative to the miter axis, the second fence having a work support surface, a rear surface opposite the work support surface, a plurality of vertical support structures extending from the rear surface, and a second stop located between a pair of vertical support structures of the second fence, the second stop protruding from the rear surface of the second fence beyond a distance in which the vertical support structures of the second fence extend from the rear surface of the second fence, the second stop movable with the second fence relative to the base;

wherein the table and/or the saw unit is engageable with the first stop when the first fence is in the first position to limit miter angle adjustment of the saw unit to a determined degree in a first rotational direction about the miter axis, and wherein the table and/or the saw unit is engageable with the second stop when the second fence is in the first position to limit miter angle adjustment of the saw unit to a determined degree in a second rotational direction about the miter axis, and wherein the table and/or the saw unit is incapable of engaging the first stop when the first fence is in the second position to allow the miter angle adjustment of the saw unit to be greater than the determined degree in the first rotational direction, and wherein the table and/or the saw unit is incapable of engaging the second stop when the second fence is in the second position to allow the miter angle adjustment of the saw unit to be greater than the determined degree in the second rotational direction.

14. The miter saw of claim 13, wherein the table includes a bevel arm mount and a bevel arm pivotably coupled to the bevel arm mount about a bevel axis oriented transverse to the miter axis.

15. The miter saw of claim 14, wherein the bevel arm mount is engageable with the first stop and the second stop to limit miter angle adjustment of the saw unit in the first rotational direction and the second rotational direction, respectively.

16. The miter saw of claim 15, wherein the saw unit is pivotably coupled to the bevel arm about a chop axis oriented transverse to the miter axis and the bevel axis.

17. The miter saw of claim 15, wherein a first side of the bevel arm mount is engageable with the first stop, and wherein a second side of the bevel arm mount is engageable with the second stop.

18. The miter saw of claim 13, wherein the combined miter angle adjustment of the saw unit in the first and second rotational directions is about 120 degrees when the first and second fences are in the first positions.

19. The miter saw of claim 13, wherein the saw unit includes a rotatable saw blade, and wherein with the first fence in the first position and the determined degree being at least about 60 degrees in the first rotational direction, a gap of at least about 8 mm measured in a direction perpendicular to a side surface of the saw blade is defined between the saw blade and the first fence.

20. The miter saw of claim 19, wherein with the second fence in the first position and the determined degree being at least about 60 degrees in the second rotational direction, a gap of at least about 8 mm measured in a direction perpendicular to the side surface of the saw blade is defined between the saw blade and the second fence.

* * * * *